United States Patent [19]

Omori

[11] Patent Number: 4,693,655

[45] Date of Patent: Sep. 15, 1987

[54] ANTI-THEFT DEVICE FOR VEHICLE WHEELS (GEARED OVAL NUT)

[76] Inventor: Shigeru Omori, Unagidani Mishinomachi, Minamiku, Osaka, Japan

[21] Appl. No.: 767,498

[22] Filed: Aug. 20, 1985

[51] Int. Cl.⁴ .............................................. F16B 41/00
[52] U.S. Cl. ..................................... 411/429; 411/910
[58] Field of Search .............. 411/429, 427, 402, 430, 411/431, 910; 81/121.1

[56] References Cited

U.S. PATENT DOCUMENTS

| | | | |
|---|---|---|---|
| D. 201,388 | 6/1965 | Pick | 411/427 X |
| 1,861,640 | 6/1932 | McCabe | 411/429 X |
| 2,371,121 | 3/1945 | Basquin | 411/427 |
| 2,372,269 | 3/1945 | Golan | 81/121.1 |
| 3,482,481 | 12/1969 | Newell | 411/402 |
| 3,859,888 | 1/1975 | Okada | 411/398 |
| 3,885,480 | 5/1975 | Muenchinger | 81/121.1 |
| 4,027,572 | 6/1977 | Burge | 411/910 X |
| 4,171,662 | 10/1979 | Simone | 411/408 |

FOREIGN PATENT DOCUMENTS 2443013  4/1975  Fed. Rep. of Germany ...... 411/402
1119435  4/1956  France .............................. 411/402

Primary Examiner—Gary L. Smith
Assistant Examiner—Adrian H. Whitcomb, Jr.

[57] ABSTRACT

An internally threaded nut is provided which is to be screwed onto a hub bolt of a vehicle, e.g. an automobile, having, on its outer surface, near the forward or leading end thereof, a plurality of key protrusions oriented in the direction of the axis of the nut, and having also, on its outer surface and rearward of the key protrusions, a modified cylindrical section. The modified cylindrical section is not a true circle and is provided with a first diameter interspersed with several flattened, or larger diameter portions, as viewed in cross-section. The key protrusions are preferably trapezoidal in cross-section, are generally parallel to each other, and each has a specific configuration wherein one or more of the key projections differ in width from the others so as to form a particular combination, which can only be turned by a key element or key socket having matching trapezoidal cavities. Different combinations of trapezoidal elements with differently modified cylindrical sections will require different key sockets. In this manner, a great number of combinations may be employed.

11 Claims, 3 Drawing Figures

ANTI-THEFT DEVICE FOR VEHICLE WHEELS (GEARED OVAL NUT)

FIELD OF THE DISCLOSURE

This design concerns an anti theft device for vehicle wheels.

BACKGROUND OF THE INVENTION

This invention is directed to an anti-theft device consisting of a nut which screws onto the hub bolt of an automobile, and a turning device or key which matches the configuration of the lug nut. However, the lug nut must have a specific configuration in order to have no one, other than a specific individual, such as the owner, to turn it with the matching key in his possession. To achieve this, the lug nut and its matching, or complementary, turning device or key must be designed so as to be made with a plurality of configurations which can be readily changed, so that each automobile in a given geographical area can be equipped with a different lug nut and key device.

In the past, in anti-theft devices of the type described, there were devices with a multiple of protrusions having a semi-circular cross-section on the forward portion of the perimeter surface of a nut with a semi-spherical head (refer to Japanese Application Ser. No. 57-194918 ) or a nut with continuous protrusions with a polygonal cross-section along the perimeter with varying pitch, and in additon, with broken mounds (refer to Japanese Application Ser. No. 54-131657). But in these types of configurations of the nut, even when the configurations are changed, the number is limited due to the fact that the former only has a multiude of protrusions, and the latter only has continuous protrusion or mound. Also, when a turning device with these simple prior art configurations is used, the nut and the turning device quite easily slip during tightening and lossening of the nut, and thus is very difficult to operate.

The aim of this design is to provide an anti-theft device for an automobile wheel which can completely solve the problems mentioned above.

SUMMARY OF THE INVENTION

The invention is directed to:

(1) an automobile wheel anti-theft lug nut having two distinct and different types of anti-theft components wherein, at the foreward section of the perimeter surface of the lug nut, a first component comprises a multitude of key protrusions oriented in the direction of the axis and at the rearward section of the perimeter surface, there is is provided a second component comprising at least one peripheral section of perimeter surface of slightly differing diameter in the cross-sectional view, i.e. a non-circular or ovoid cross-section is provided, which out-of-round cross-sectional shape is, preferably, so slight that it is not visible to the naked eye;

(2) the lug nut mentioned in subparagraph (1) above in which, in the first component, the plurality of key protrusions are arranged in parallel with each other around the perimeter surface, and the cross-section of one protrusion differs from another;

(3) the lug nut mentioned in subparagraph (1) or subparagraph (2) above in which at least one of the key protrusions has a trapezoidal cross-section; and (4) a device mentioned in any of subparagraphs 1, 2 or 3 above with at least one section of the perimeter surface having a longitudinal taper.

DETAILED DESCRIPTION OF THE INVENTION

The directional relationship in the following description is referred to FIG. 2, and forward refers to the direction of the lug nut when tightened, which is toward the right of FIG. 2, and rearward is referred toward the left of FIG. 2.

The anti-theft device based on the design of this invention consists of a plurality of protrusions oriented along the direction of the axis at a forward section on the perimeter surface of the nut, and at least one other portion of the perimeter surface has a slightly different diameter on the cross-sectional view, wherein the cross-sectional view is slightly ovoid.

Figure 1:
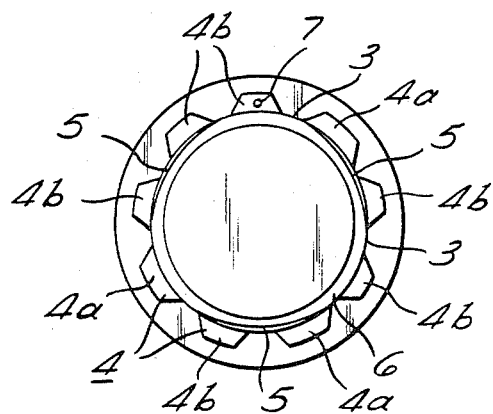
FIG. 1 represents a rear view of the lug nut.
Figure 2:
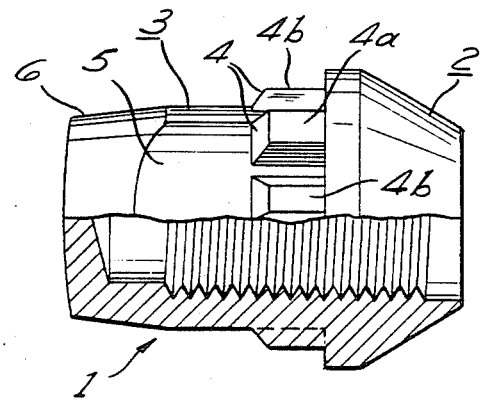
FIG. 2 represents a side view of the lug nut.

The lug nut 1 consists preferably of a forward tapered section 2 and a rearward column section 3, as in FIGS. 1 and 2. There are nine key protrusions 4 oriented along the axis at the forward section of the column section 3; in other words, slightly toward the front from the center of the entire length of the lug nut 1. These key protrusions 4 are positioned parallel along the perimeter and all have a preferably trapezoidal cross-section, but several, e.g. three out of nine, are a wider trapezoid, in cross-section, than the other six. In one example, 1, 2 or 3 narrower trapezoids 4b are placed between the three wider trapezoids 4a. A dot mark 7 for positioning is place on one of the nine key protrusions 4a or 4b. Except for the rear end section 6 of the column section 3, the perimeter surface of the column section is a modified sylinder and its cross-section has several large diameter sections 5, which diameters 5 are larger than that of the cylinder perimeter 3, and three of the larger diameters 5 are equally spaced along the perimenter 3. Thus, the cross-section of the said perimeter surface is not a true circle but is slightly out-of-round or ovoid.

The rear end section 6 of the column section 3 is preferably a tapered surface which narrows toward the rear. In the embodiment shown, only the perimeter surface of the rear end section 6 of the column section 3 has a tapered surface, as mentioned above, but it is also acceptable to have the entire perimeter surface of the cylinder section 3 longitudinally tapered. In this arrangement, even when a third party tries to turn the lug nut 1 using such tools as a spanner or monkey wrench, the tool would slip against the tapered surface and would not be able to turn it.

Figure 3:
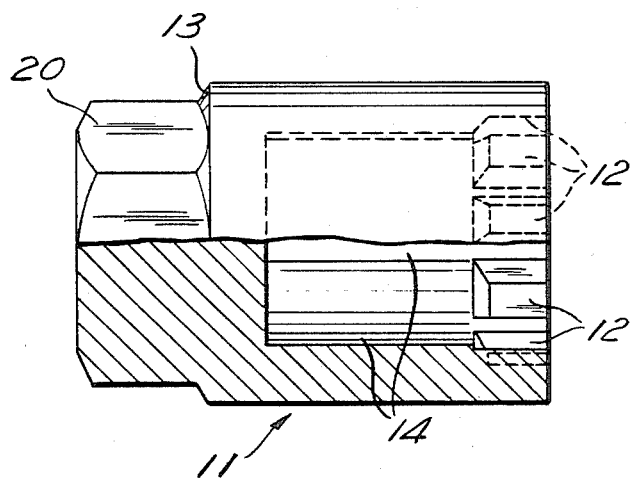
FIG. 3 represents a side view of the turning device or key for the lug nut.

FIG. 3 shows the key or turning device 11 used to turn the lug nut 1 and having, at its rear end, a torquing or untorquing surface, e.g. a hexagonal shape 20. The inside surface of key 11 is matched to the outside surface of the cylinder section 3 of the lug nut 1. That is, on the inside surface cross-section, there are three large diameter sections 14 which have a larger diameter than that of the inside surface and at the foreward section of the inside surface are the key extrusions or cavities 12 which match the configuration of the key protrusions 4. Also, there is a mark 13 which coincides with the mark 7 on the nut 1 to match up the lug nut and key configurations.

Based on the just-described design, since the multitude of key protrusions 4a, 4b are oriented along the axis on the foreward part of the perimeter surface of the nut 1 and at least one section of the perimeter surface cross-section of the column section 3 has a different diameter than that of another perimeter surface cross-section, the configuration characteristic of the lug nut 1 is at two places: at the key protrusions 4a, 4b and diameter differences of the column sections 3 and 5.

The column cross-sections 3 and 5 are very slighty different only in curvature so that the slightly out-of-round characteristic is not noticeable, even to a professional thief, and the configuration of this invention makes it very difficult to quickly select the proper turning device.

Thus, by varying the characteristics of these two places, construction of the nut 1 and the turning device 11 with various configurations is possible, and achievement of more complete protection against theft of wheels, by installing a nut with a different configuration on each automobile.

Also, the nut 1 and the turning device 11 not only make contact at the key protrusions 4a, 4b, but also at the diameter difference on the perimeter surface column section 3, so during the tightening and the lossening of the nut 1, the contact areas 3, will not slip, and the operation is extremely easy.

In summary, an internally threaded nut 1 is provided which is to be screwed onto a hub bolt of an automobile. The nut 1 has, on its outer surface, near the forward or leading end thereof, a plurality of kept protrusions oriented in the direction of the axis of the nut, and includes also, on its outer surface and rearward of the key protrusions, a modified cylindrical section. The modified cylindrical section is not a true circle and is slight out-of-round, and presents several flattened, or large diameter portions, as viewed in cross-section. The key protrusions are preferably trapezoidal in cross-section, are generally parallel to each other, and each has a specific configuration wherein one or more of the key projections differ in width from the others so as to form a particular combination, which can only be turned by a key element or key socket having matching trapezoidal cavities. Different combinations of trapezoidal elements with differently modified cylindrical sections will require different key sockets. In this manner, a great number of combinations may be employed. If, for example, nine trapezoidal elements are used, numbers 1, 3 and 6 may be wider than the others, and in another combination, numbers 2, 4 and 8 may be wider.

Trapezoidal elements are preferred to other elements because each trapezoid presents side-bearing walls against which the corresponding side walls forming the trapezoidal cavities can bear, and aid in torquing the nut.

Furthermore, the number of combinations may be enhanced and incresed by having the cylindrical surface 3 modified to a slighty out-of-round condition in a number of different ways, in relationship to the narrow and wide trapezoidal element. The thusly modified cylindrical surface provides flattened sections of one diameter and more rounded sections of a second diameter. The more rounded sections provide contact points, during torquing and untorquing, of the key element or turning device 11.

I claim:

1. An anti-theft lug nut which includes:
a column section having:
(a) a plurality of protrusions on the periphery of said column section said protrusions being trapezoidal in cross-section, and at least one of said trapezoidal protrusions having a different cross-section than the remainder of said trapezoidal protrusions, at least one of said trapezoidal protrusions having side-bearing walls for torquing and untorquing of said lug nut; and
(b) a modified cylindrical section adjacent said protrusions, said modified cylindrical section, when viewed in cross-section, having at leat one portion of the cross-section of different diameter than the diameter of the remainder of said modified cylindrical section.

2. The anti-theft lug nut of claim 1 characterized by:
a forward section; and
said column section being provided rearward of said forward section.

3. The anti-theft lug nut of claim 2 characterized by:
a forward section, said forward section being tapered.

4. The anti-theft lug nut of claim 1 characterized by:
said modified cylindrical section having said protrusions forward of said modified cylindrical section.

5. The anti-theft lug nut of claim 1 wherein:
said modified cylindrical section has a rearward tapered section, as viewed in side elevation.

6. The anti-theft lug nut of claim 1 wherein:
said forward section is tapered, said protrusions lie on the periphery of the forward part of said column section and are oriented along the axis of said lug nut, and said modified cylindrical section lies rearward of said protrusions.

7. The anti-theft lug nut of claim 6 wherein:
at the rear end of said column section, a tapered section, circular in cross-section, is provided.

8. In combination with said lug nut of claim 1:
a turning device comprising, on its inside surface cross-section, a complementary column section to the said column section of said lug nut.

9. The combination of claim 8 wherein:
said turning device has a plurality of protrusions complementary to said lug nut and has a modified cylindrical section complementary to said cylindrical section of said lug nut.

10. The combination of claim 9 wherein:
said lug nut and said turning device make contact at the said protrusions and also at said diameter difference on the said periphery of said column section during the tightening and loosening of the lug nut.

11. The anti-theft lug nut of claim 1 characterized by:
said different diameter of said cross-section of said modified cylindrical section being an imperceptible difference to the naked eye.

* * * * *